Patented Oct. 13, 1953

2,655,463

UNITED STATES PATENT OFFICE 2,655,463

DESULFURIZATION OF HYDROCARBONS

Alfred E. Hoffman, Clarendon Hills, Ill., assignor to Universal Oil Products Company, Chicago, Ill., a corporation of Delaware No Drawing. Application November 30, 1950, Serial No. 198,479

4 Claims. (Cl. 196—31)

This invention relates to the desulfurization of hydrocarbons and more particularly to the desulfurization of hydrocarbons in the presence of hydrogen fluoride.

The use of hydrogen fluoride for the desulfurization of hydrocarbons recently has become important. The present invention is directed to an improvement in this process in order to increase desulfurization and also to permit the use of less hydrogen fluoride.

In one embodiment the present invention relates to a process for desulfurizing hydrocarbons containing sulfur which comprises treating said hydrocarbons with a solution of hydrogen fluoride in a chlorohydrocarbon.

In a specific embodiment the present invention relates to a process for desulfurizing gasoline containing sulfur which comprises treating said gasoline with a solution of hydrogen fluoride in an alkyl chloride under sufficient pressure to maintain said solution in liquid phase.

The hydrocarbons to be treated in accordance with the present invention may comprise any hydrocarbon fraction containing sulfur compounds. Typical hydrocarbon fractions containing sulfur which may be treated comprise straight run fractions from petroleum including gasoline, naphtha, kerosene, gas oil, burner oil, diesel oil, fuel oil, etc., cracked stocks including gasoline, naphtha, gas oil, kerosene, burner oil, diesel oil, fuel oil, etc.

In accordance with the present invention the sulfur containing hydrocarbon charge is treated with a solution of hydrogen fluoride in a chlorohydrocarbon. Suitable chlorohydrocarbons include alkyl chlorides such as methyl chloride, ethyl chloride, propyl chloride, butyl chloride, amyl chloride, hexyl chloride, etc., alkyl polychlorides including methylene dichloride, ethylene dichloride, propylene dichloride, trichloroethane, trichloroethylene, tetrachloroethane, etc., and chlorofluorohydrocarbons including dichlorodifluoromethane, trichloromonofluoromethane, 1,1,1-difluorochloroethane, etc.

The proportions of hydrogen fluoride and solvent may vary considerably but in general will be within the range of from about 0.1 to 5 volumes of hydrogen fluoride per volume of solvent. Generally it is preferred to utilize from about 0.25 to 2 volumes of hydrogen fluoride per volume of chlorohydrocarbon.

The desulfurization generally is effected at a temperature of from about 50° to about 200° F. and under sufficient pressure to maintain the treating solution in liquid phase. This pressure in general will range from about 100 to 500 pounds per square inch or more. The hydrogen fluoride employed preferably is above about 75% concentration and still more preferably is from about 85% concentration to anhydrous. The volume of hydrogen fluoride per volume of hydrocarbon charge generally will range from about 10% to about 50% by volume but will be less than would be required for the same desulfurization in the absence of the chlorohydrocarbon solvent.

The desulfurization may be effected in any suitable manner and in general will comprise contacting the hydrocarbon charge with the solution of hydrogen fluoride in chlorohydrocarbon in a reaction zone equipped with suitable mixing means. After thorough mixing and reaction, the effluent products are directed to a settler wherein an acid phase separates from a hydrocarbon phase. The acid phase is withdrawn and may be treated in any suitable manner such as by distillation, etc. to recover hydrogen fluoride for further use in the process and also to recover solvent for further use in the process. When a lower boiling chlorohydrocarbon is utilized, it may be recovered in admixture with the hydrogen fluoride. When a higher boiling chlorohydrocarbon is employed, it may be recovered by further distillation or by any other suitable means.

It is understood that other suitable methods for effecting the desulfurization may be employed including, for example, a counterflow continuous operation in which the hydrocarbon charge is introduced into the lower portion of a reaction zone and the hydrogen fluoride chlorohydrocarbon is introduced into the upper portion of said zone. The acid phase and hydrocarbon phase are each separately continuously withdrawn and the former is treated as aforesaid to recover the hydrogen fluoride and solvent for reuse in the process.

The following examples are introduced to illustrate further the novelty and utility of the present invention but not with the intention of unduly limiting the same.

Example I

A West Texas cracked gasoline containing about 0.3% sulfur may be treated with a solution comprising 50% by volume of 90% concentration hydrogen fluoride and 50% by volume of dichlorodifluoromethane at a temperature of 70° F. and a pressure of 300 pounds per square inch. When treating the gasoline with 1 volume of solution per 4 volumes of gasoline, the gasoline will be reduced in sulfur content to below about 0.001%.

In the absence of the chlorohydrocarbon, it appears necessary to utilize a larger volume of hydrogen fluoride to obtain equivalent desulfurization.

*Example II*

Straight run diesel oil having a sulfur content of 0.4% sulfur may be treated with a solution of 25% anhydrous hydrogen fluoride in 75% by volume of ethyl chloride. The desulfurization may be effected at a temperature of 100° F. and a pressure of 200 pounds per square inch. The diesel oil will be reduced in sulfur to below about 0.005%.

Here again the desulfurization may be effected by utilizing less hydrogen fluoride than otherwise would be required.

I claim as my invention:

1. A process for desulfurizing hydrocarbons containing sulfur which comprises treating said hydrocarbons with a solution of hydrogen fluoride in a chlorofluorohydrocarbon at a temperature of from about 50° to about 200° F. and at a pressure of from about 100 to about 500 pounds per square inch.

2. A process for desulfurizing hydrocarbons containing sulfur which comprises treating said hydrocarbons with a solution of hydrogen fluoride in a chlorofluorohydrocarbon under sufficient pressure to maintain said solution in liquid phase.

3. A process for desulfurizing gasoline containing sulfur which comprises treating said gasoline with a solution of hydrogen fluoride in dichlorodifluoromethane under sufficient pressure to maintain said solution in liquid phase.

4. A process for desulfurizing gasoline containing sulfur which comprises treating said gasoline with a solution of hydrogen fluoride in trichloromonofluoromethane under sufficient pressure to maintain said solution in liquid phase.

ALFRED E. HOFFMAN.

References Cited in the file of this patent

UNITED STATES PATENTS

| Number | Name | Date |
|---|---|---|
| 2,378,762 | Frey | June 19, 1945 |
| 2,465,964 | Brooke et al. | Mar. 29, 1949 |